(12) United States Patent
Shan (10) Patent No.: US 10,823,837 B2
(45) Date of Patent: Nov. 3, 2020

(54) METHOD FOR VEHICLE LOCATION ESTIMATION USING ORTHOGONAL FREQUENCY-DIVISION MULTIPLEXING

(71) Applicant: Tiejun Shan, Plano, TX (US)

(72) Inventor: Tiejun Shan, Plano, TX (US)

(73) Assignee: THE EUCLIDE 2012 INVESTMENT TRUST, Plano, TX (US)

( * ) Notice: Subject to any disclaimer, the term of this patent is extended or adjusted under 35 U.S.C. 154(b) by 112 days.

(21) Appl. No.: 16/252,377

(22) Filed: Jan. 18, 2019

(65) Prior Publication Data
US 2019/0219686 A1    Jul. 18, 2019

Related U.S. Application Data

(63) Continuation-in-part of application No. 16/248,761, filed on Jan. 15, 2019, and a continuation-in-part of application No. 16/242,958, filed on Jan. 8, 2019, and a continuation-in-part of application No. 16/249,351, filed on Jan. 16, 2019, and a continuation-in-part of application No. 16/252,257, filed on Jan. 18, 2019.

(60) Provisional application No. 62/617,962, filed on Jan. 16, 2018, provisional application No. 62/616,844, filed on Jan. 12, 2018, provisional application No. 62/619,204, filed on Jan. 19, 2018, provisional application No. 62/628,436, filed on Feb. 9, 2018, (Continued)

(51) Int. Cl.
*G01S 13/72*    (2006.01)
*H04B 7/0417*    (2017.01)
*G01S 13/931*    (2020.01)
*H04B 1/69*    (2011.01)
*H04W 4/40*    (2018.01)
*H04L 5/00*    (2006.01)

(52) U.S. Cl.
CPC .......... *G01S 13/726* (2013.01); *G01S 13/931* (2013.01); *H04B 1/69* (2013.01); *H04B 7/0421* (2013.01); *H04L 5/0048* (2013.01); *H04W 4/40* (2018.02); *H04B 2201/70701* (2013.01)

(58) Field of Classification Search
CPC ... G01S 13/726; G01S 13/931; H04B 7/0421; H04B 1/69; H04W 4/40; H04L 5/0048
USPC .......................................... 342/107, 24, 142
See application file for complete search history.

(56) References Cited

U.S. PATENT DOCUMENTS

7,756,007 B2 * 7/2010 Nicoli et al. ............. H04J 11/00
370/210
9,735,940 B1 * 8/2017 Bakr et al. ............. H04W 4/00
(Continued)

*Primary Examiner* — Bo Fan (57) ABSTRACT

A method for vehicle location estimation using orthogonal frequency-division multiplexing (OFDM) is provided with an OFDM device that consists of a wireless terminal and a multiple-input and multiple-output (MIMO) antenna. A pilot uplink signal is transmitted towards from the wireless terminal towards the intended target which is within an operational range of the MIMO antenna. Upon contacting the intended target and a plurality of target-surrounding objects, a plurality of return signals is generated to be received by the wireless terminal. A plurality of echo signals that was reflected from the plurality of target-surrounding objects is separated so that a time delay between the pilot uplink signal and the plurality of echo signals can be determined. The time delay along with a direction of arrival determined through the MIMO antenna are used to derive a location approximation for the intended target.

9 Claims, 12 Drawing Sheets

Related U.S. Application Data provisional application No. 62/630,416, filed on Feb. 14, 2018, provisional application No. 62/754,448, filed on Nov. 1, 2018, provisional application No. 62/756,318, filed on Nov. 6, 2018, provisional application No. 62/617,723, filed on Jan. 16, 2018, provisional application No. 62/618,735, filed on Jan. 18, 2018.

(56) References Cited

U.S. PATENT DOCUMENTS

| | | | | |
|---|---|---|---|---|
| 2010/0062802 A1* | 3/2010 | Amram | ............... | H04B 7/086 455/556.1 |
| 2012/0063492 A1* | 3/2012 | Palanki | ............. | H04B 7/15585 375/211 |
| 2016/0352419 A1* | 12/2016 | Fonseka | ............ | H03M 13/2775 |
| 2017/0325207 A1* | 11/2017 | Wolf | ............... | H04W 72/0406 |

* cited by examiner

METHOD FOR VEHICLE LOCATION ESTIMATION USING ORTHOGONAL FREQUENCY-DIVISION MULTIPLEXING

The current application claims a priority to the U.S. Provisional Patent application Ser. No. 62/619,204 filed on Jan. 19, 2018.

The current application also claims a priority to a U.S. non-provisional application Ser. No. 16/252,257 filed on Jan. 18, 2019. The U.S. non-provisional application Ser. No. 16/252,257 claims a priority to the U.S. Provisional Patent application Ser. No. 62/618,735 filed on Jan. 18, 2018.

The current application also claims a priority to a U.S. non-provisional application Ser. No. 16/249,351 filed on Jan. 16, 2019. The U.S. non-provisional application Ser. No. 16/249,351 claims a priority to a U.S. provisional application Ser. No. 62/617,723 filed on Jan. 16, 2018.

The current application also claims a priority to a U.S. non-provisional application Ser. No. 16/248,761 filed on Jan. 15, 2019. The U.S. non-provisional application Ser. No. 16/248,761 claims a priority to a U.S. provisional application Ser. No. 62/617,962 filed on Jan. 16, 2018.

The current application also claims a priority to a U.S. non-provisional application Ser. No. 16/242,958 filed on Jan. 8, 2019. The U.S. non-provisional application Ser. No. 16/242,958 claims a priority to a U.S. provisional application Ser. No. 62/616,844 filed on Jan. 12, 2018.

The current application also claims a priority to the U.S. Provisional Patent application Ser. No. 62/628,436 filed on Feb. 9, 2018.

The current application also claims a priority to the U.S. Provisional Patent application Ser. No. 62/630,416 filed on Feb. 14, 2018.

The current application also claims a priority to the U.S. Provisional Patent application Ser. No. 62/754,448 filed on Nov. 1, 2018.

The current application also claims a priority to the U.S. Provisional Patent application Ser. No. 62/756,318 filed on Nov. 6, 2018.

FIELD OF THE INVENTION

The present invention relates generally to an adaptive optimal filtering system approach that provides vehicle location sensing and vehicle identification. By utilizing the present invention, the vehicle location estimation can be improved to use varying OFDM wireless systems.

BACKGROUND OF THE INVENTION

Wireless communication networks and radar functionalities for vehicles is a fast-growing area of interest in the automobile industry and wireless technology research. The rapid growth is mainly due to the plethora of possibilities related to wireless technologies.

The present invention uses a multiple-input multiple-output (MIMO) antenna array to enhance $V_2X$ communication, wherein a target vehicle communicates and gathers information from moving objects that surround the target vehicle. By doing so, the present invention can track and locate multiple targets with greater accuracy. The present invention also intends to address issues that can occur from interference and jamming generated from other vehicles equipped with $V_2X$ transceivers.

To fulfill the intended objectives, the present invention introduces a novel system and design for automobile radar and communications networks and related applications. More specifically, the present invention is an optimal filtering system and pilot signal detection approach that provides the location of a vehicle via an orthogonal frequency-division multiplexing (OFDM) device that can use varying communication wave technologies. Fourth generation wireless (4G), fifth generation wireless (5G), 4G-long term evolution (4G-LTE), and Wi-Fi are some of the communication standards that can be used with the present invention. By utilizing the present invention, the need for a separate radar device in a vehicle can be eliminated.

DETAIL DESCRIPTIONS OF THE INVENTION

All illustrations of the drawings are for the purpose of describing selected versions of the present invention and are not intended to limit the scope of the present invention.

The present invention introduces a method to improve vehicle location estimation and vehicle identification. To do so, the present invention utilizes communication standards that can be, but is not limited to, fourth generation wireless (4G), fifth generation wireless (5G), 4G-long term evolution (4G-LTE), and Wi-Fi. The overall design of the present invention eliminates the need for a vehicle to have a separate radar system.

To fulfill the intended functionalities, the present invention is provided with an orthogonal frequency-division multiplexing (OFDM) device that comprises a wireless terminal and a multiple-input and multiple-output (MIMO) antenna. The wireless terminal functions as an access point for the OFDM device that transmits and receives signals that are used to estimate the location of a single target or multiple targets. The MIMO antenna is used to determine the direction of arrival (DOA) of a selected signal or a combination of signals received at the wireless terminal.

Figure 1:
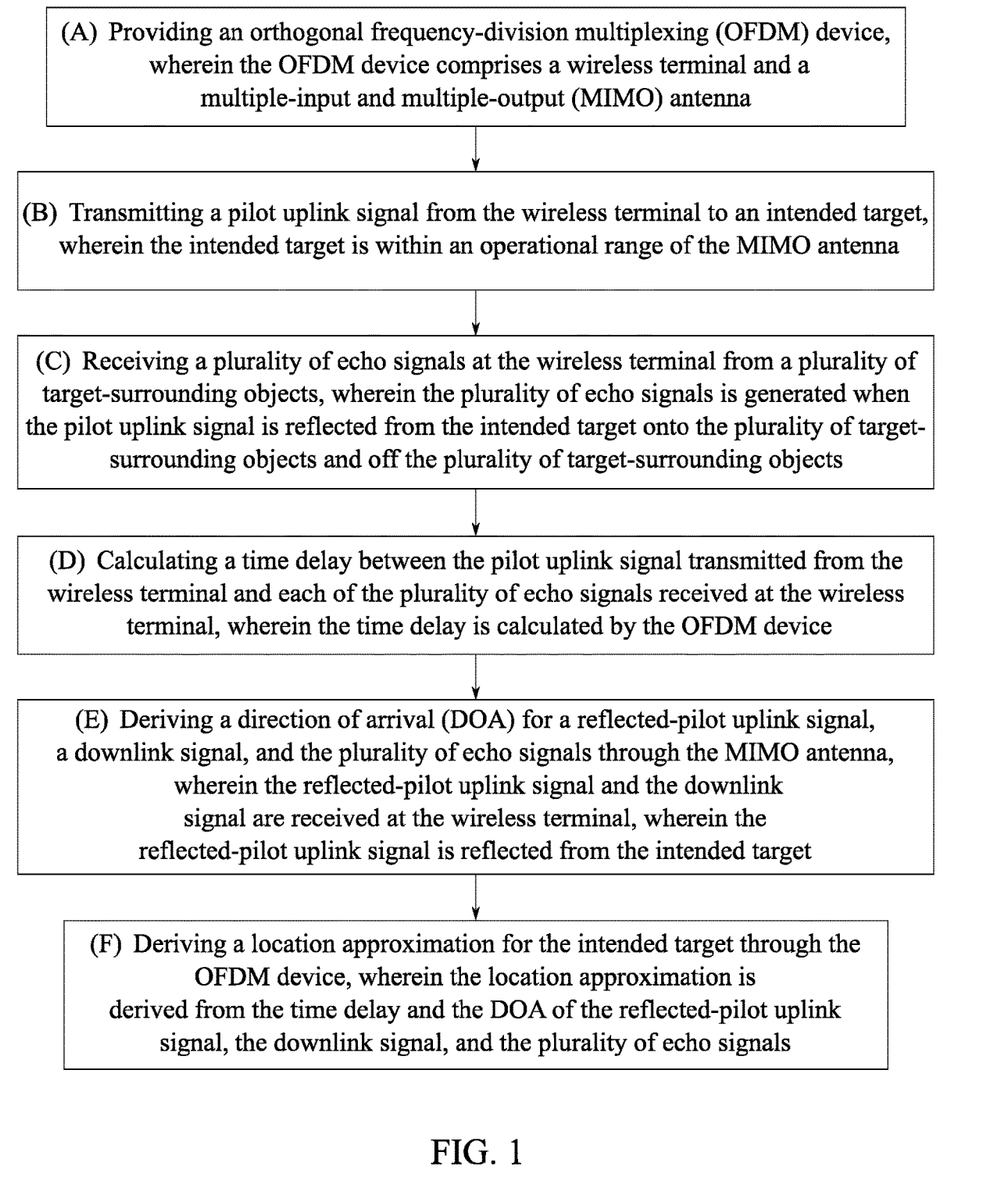
FIG. 1 is a flowchart illustrating the basic overall process of the present invention.

As illustrated in FIG. 1, in an initial step of locating a target, the present invention transmits a pilot uplink signal from the wireless terminal to an intended target. For the pilot uplink signal to reach the intended target as required, the intended target is positioned within an operational range of the MIMO antenna. When the pilot uplink signal contacts the intended target, a reflected-pilot uplink signal is generated which is then received at the wireless terminal. Additionally, a plurality of echo signals is generated when the pilot uplink signal is reflected onto a plurality of target-surrounding objects and off the plurality of target-surrounding objects. Similar to the reflected-pilot uplink signal, the plurality of echo signals is also received at the wireless terminal. The plurality of target-surrounding objects can be, but is not limited to, cars, pedestrians, and animals. When the plurality of echo signals is received at the wireless terminal, the present invention proceeds to calculate the time delay between the pilot uplink signal that was initially transmitted from the wireless terminal and each of the plurality of echo signals received at the wireless terminal. When the time delay between the pilot uplink signal and each of the plurality of echo signals is calculated, the present invention derives a direction of arrival (DOA) from the reflected-pilot uplink signal, a downlink signal, and each of the plurality of echo signals. Similar to the reflected-pilot uplink signal, the downlink signal is also received at the wireless terminal. Based upon the time delay calculated and the DOA determined from the reflected-pilot uplink signal, the downlink signal, and the plurality of echo signals, the present invention proceeds to derive a location approximation for the intended target through the OFDM device.

Figure 2:
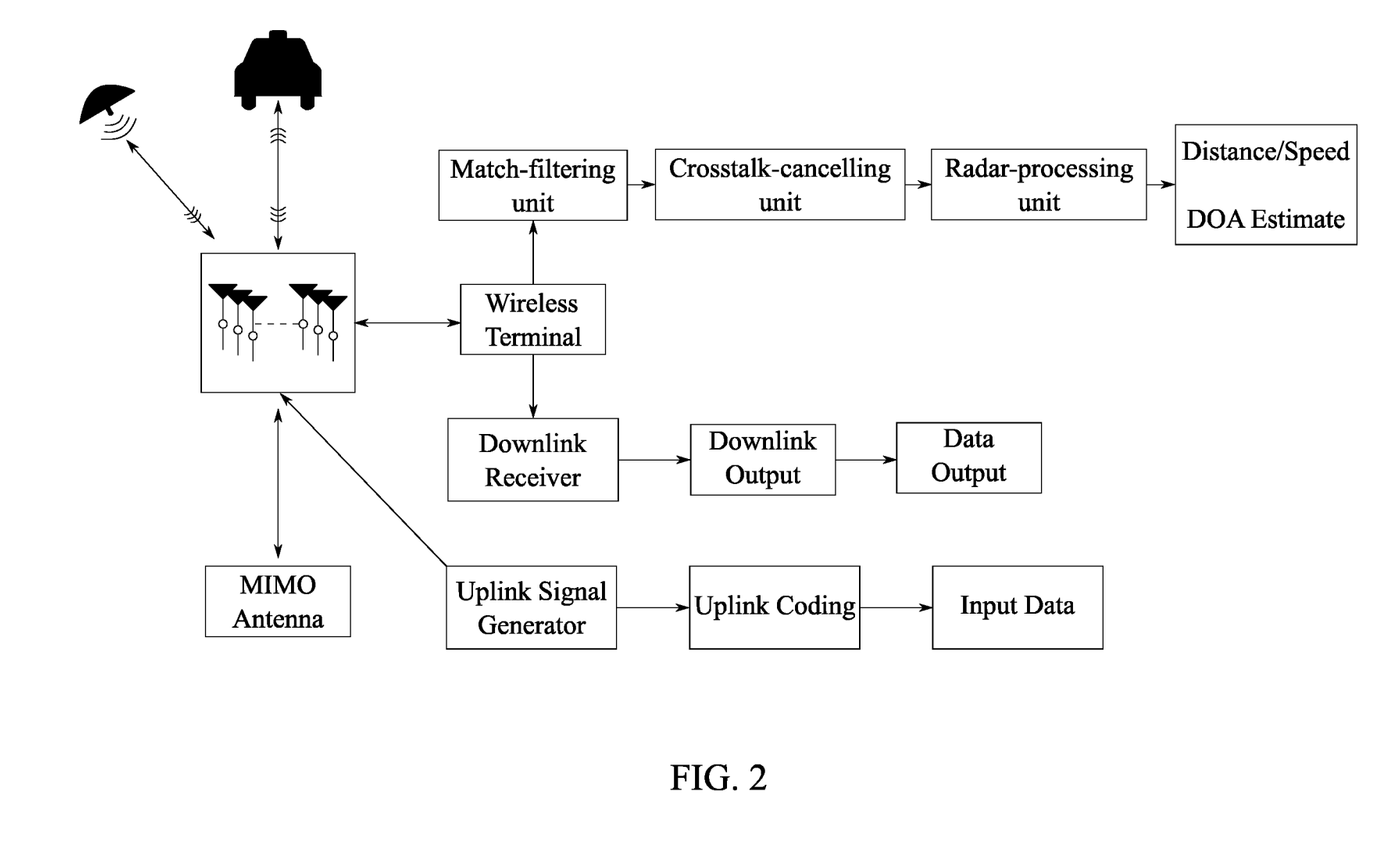
FIG. 2 is an illustration of the process of isolating the plurality of echo signals.
Figure 3:
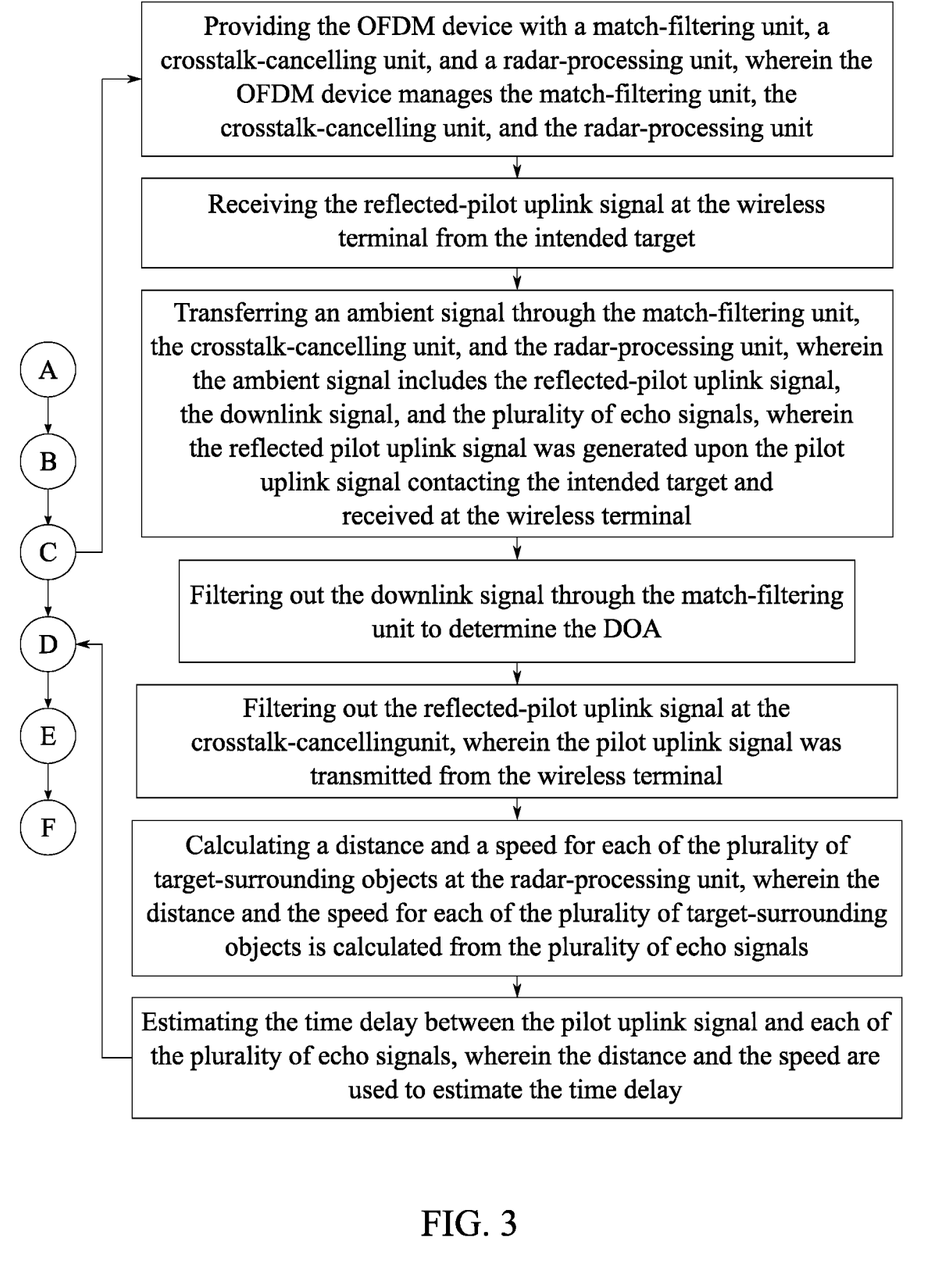
FIG. 3 is a flowchart illustrating the basic overall process of isolating the plurality of echo signals.

To separate the plurality of echo signals that will be used for time delay calculations, as shown in FIG. 2 and FIG. 3, the OFDM device is provided with a match-filtering unit, a crosstalk-cancelling unit, and a radar-processing unit. The OFDM device manages the match-filtering unit, the crosstalk-cancelling unit, and the radar-processing unit. As mentioned earlier, when the pilot uplink signal contacts the intended target, the reflected-pilot signal is generated at the intended target, and travels towards the wireless terminal to be received at the wireless terminal. Upon receiving an ambient signal, wherein the ambient signal includes the reflected-pilot uplink signal, the downlink signal, and the plurality of echo signals, the present invention proceeds to filter the plurality of echo signals by transferring the reflected-pilot uplink signal, the downlink signal, and the plurality of echo signals through the match-filtering unit, the crosstalk-cancelling unit, and the radar processing unit. In the process, the downlink signal is initially filtered out through the match-filtering unit and is used for determining the DOA. Subsequently, the reflected-pilot uplink signal, which has zero-time delay compared to the initially transmitted pilot uplink signal, is filtered out at the crosstalk-cancelling unit. Upon removing the reflected-pilot uplink signal, the plurality of echo signals, which is the remainder of the ambient signal, is used to determine the distance and speed of each of the plurality of target-surrounding objects that generated each of the of plurality of echo signals. Utilizing the distance and the speed of each of the plurality of target-surrounding objects, the present invention estimates the time delay between the pilot uplink signal and each of the plurality of echo signals.

Figure 4:
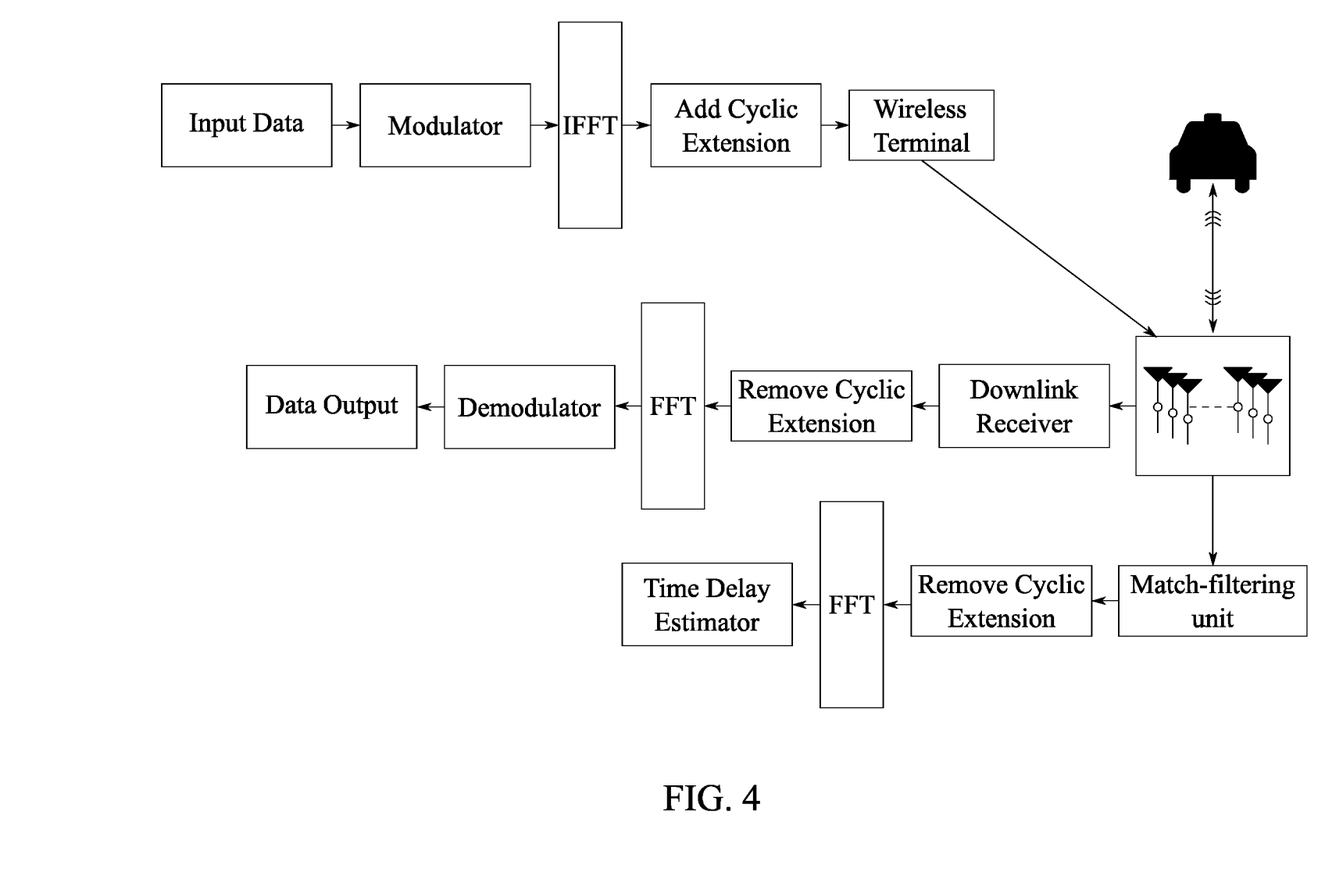
FIG. 4 is an illustration of the process of adding a cyclic prefix.
Figure 5:
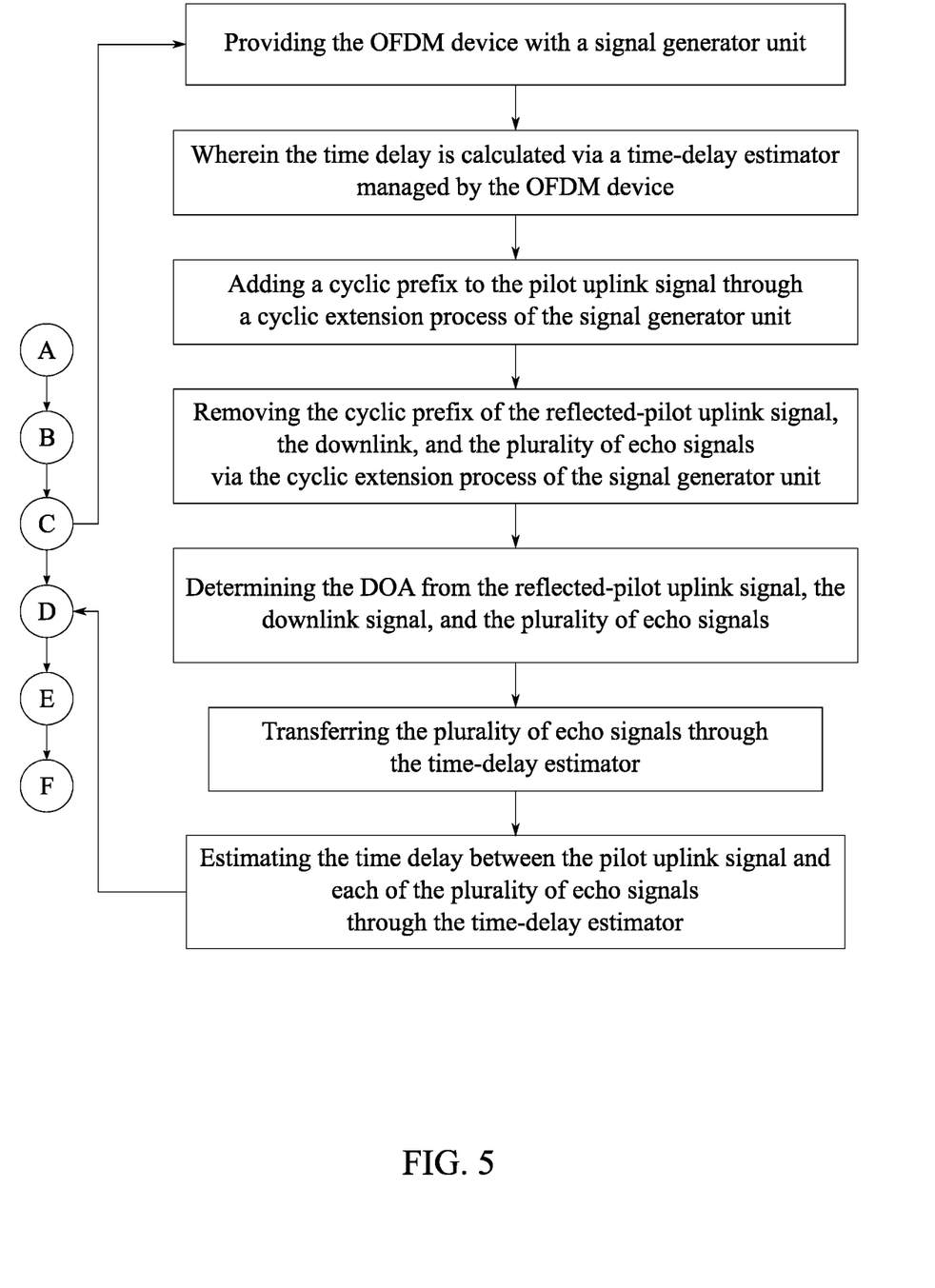
FIG. 5 is a flowchart illustrating the basic overall process of calculating the time delay via a time delay estimator.

As illustrated in FIG. 4 and FIG. 5, varying time delay calculation methods can be used in the present invention. In one embodiment, the time delay can be calculated via a time-delay estimator managed by the OFDM device. For the pilot uplink signal to function reliably and avoid intersymbol interference within the pilot uplink signal, the present invention adds a cyclic prefix to the pilot uplink signal through a cyclic extension process of a signal generator unit, wherein the OFDM device is provided with a signal generator unit. When the transmitting process is completed and when the reflected-pilot uplink signal, the downlink signal, and the plurality of echo signals are received at the wireless terminal, the cyclic extension process of the signal generator unit is utilized again to remove the cyclic prefix of each of the received signals. The present invention then proceeds to determine the DOA of the reflected-pilot uplink signal, the downlink signal, and the plurality of echo signals. In order to determine the time delay, the plurality of echo signals is then transferred through the time-delay estimator. An output from the time-delay estimator aids in estimating the time delay between the pilot uplink signal and each of the plurality of echo signals. The output from the time-delay estimator along with the DOA determined from the reflected-pilot uplink signal, the downlink signal, and the plurality of echo signals are used to derive the location approximation for the intended target.

Figure 6:
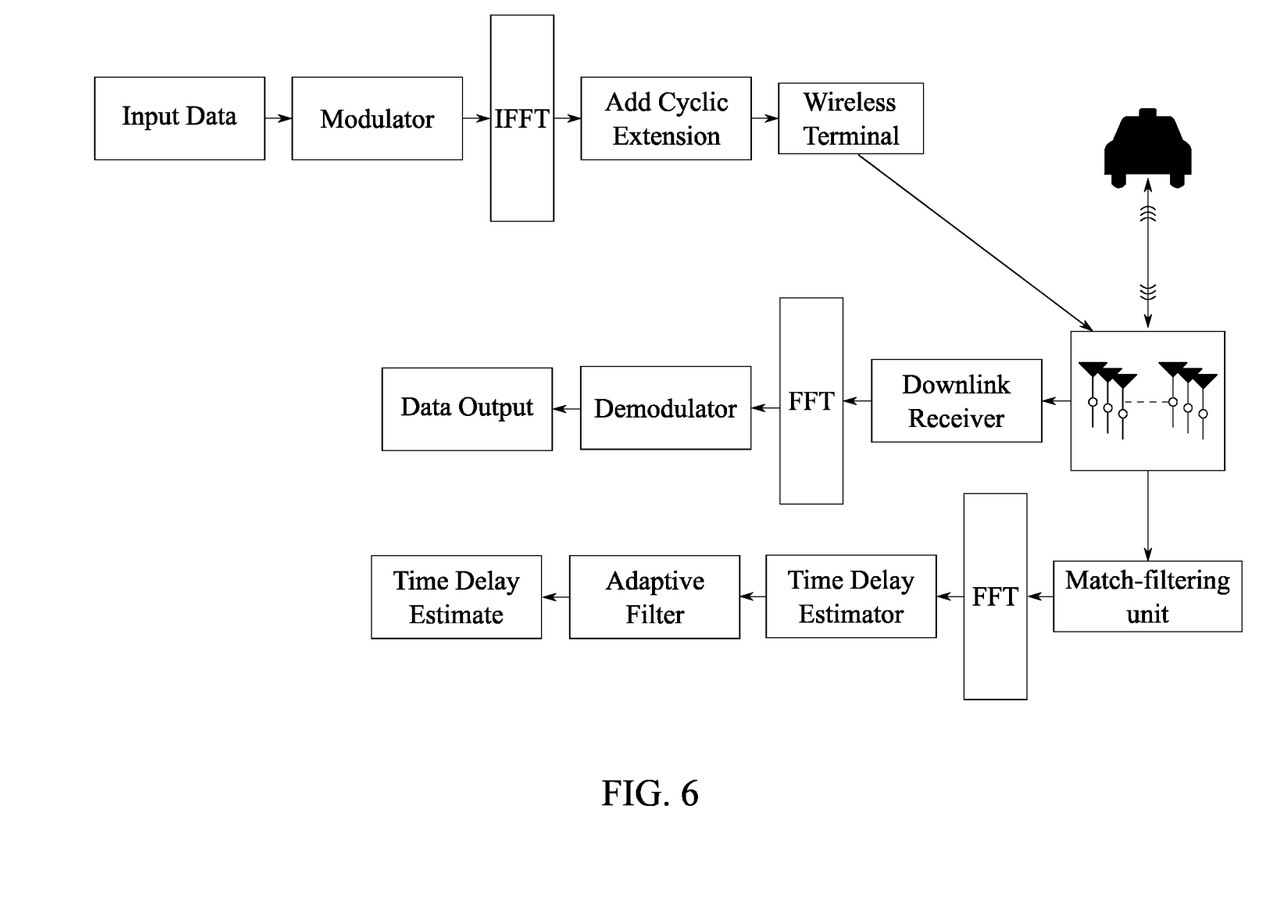
FIG. 6 is an illustration of the process of calculating the time delay using the cyclic prefix of the pilot uplink signal.
Figure 7:
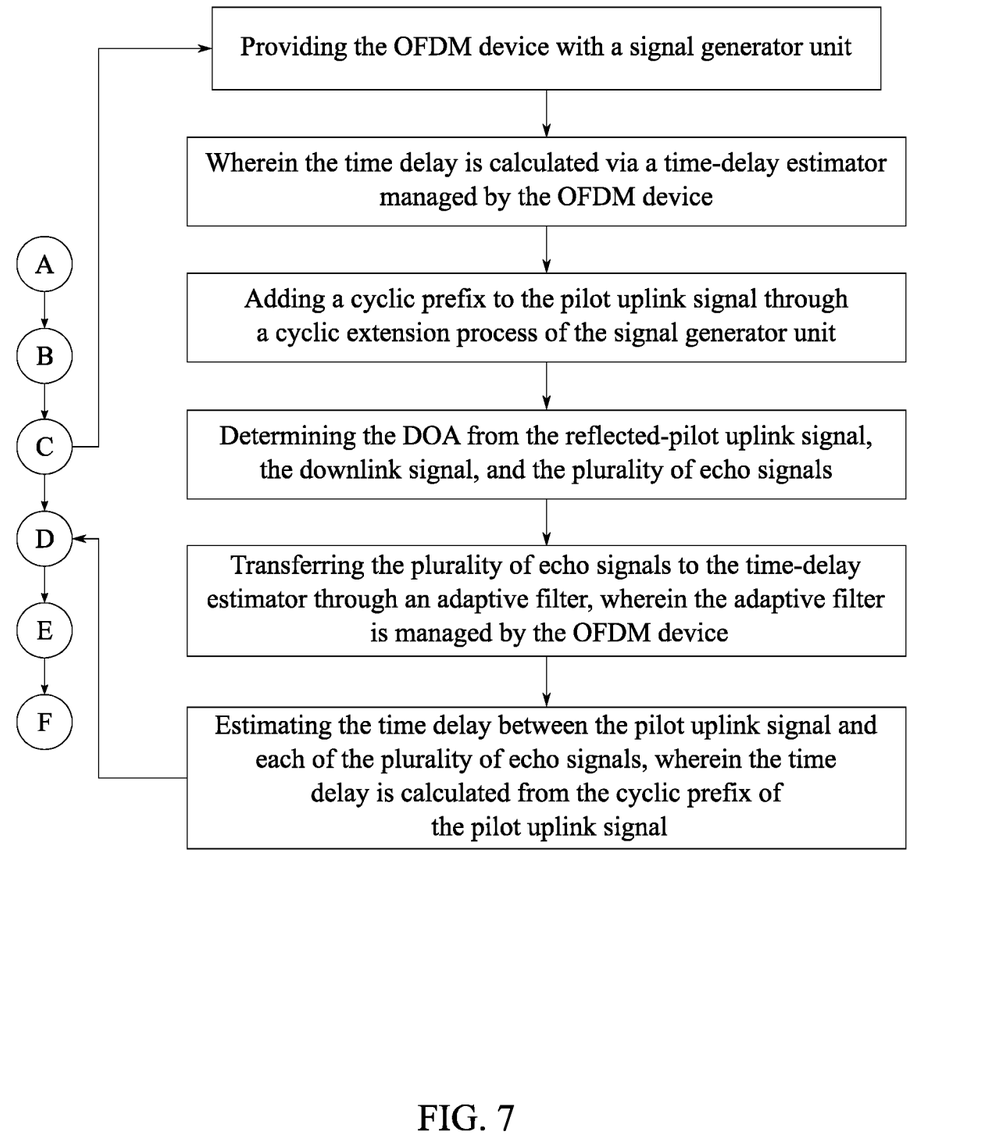
FIG. 7 is a flowchart illustrating the basic overall process of using the cyclic prefix for estimating the time delay.

As shown in FIG. 6 and FIG. 7, the removal of the cyclic prefix can be bypassed since the present invention functions as a short-range radar. Therefore, after receiving the reflected-pilot uplink signal, the downlink signal, and the plurality of echo signals, the present invention proceeds to determine the DOA accordingly. Next, in order to determine the time delay, the present invention transfers the plurality of echo signals to the time-delay estimator through an adaptive filter managed by the OFDM device. As a result, the time-delay estimator proceeds to estimate the time delay between the pilot uplink signal and each of the plurality of echo signals, wherein the time delay is calculated using the cyclic prefix of the pilot uplink signal. When calculating the time delay from one target, a global minimum is considered. On the other hand, when multiple targets are considered, a local minimum is preferred.

Figure 8:
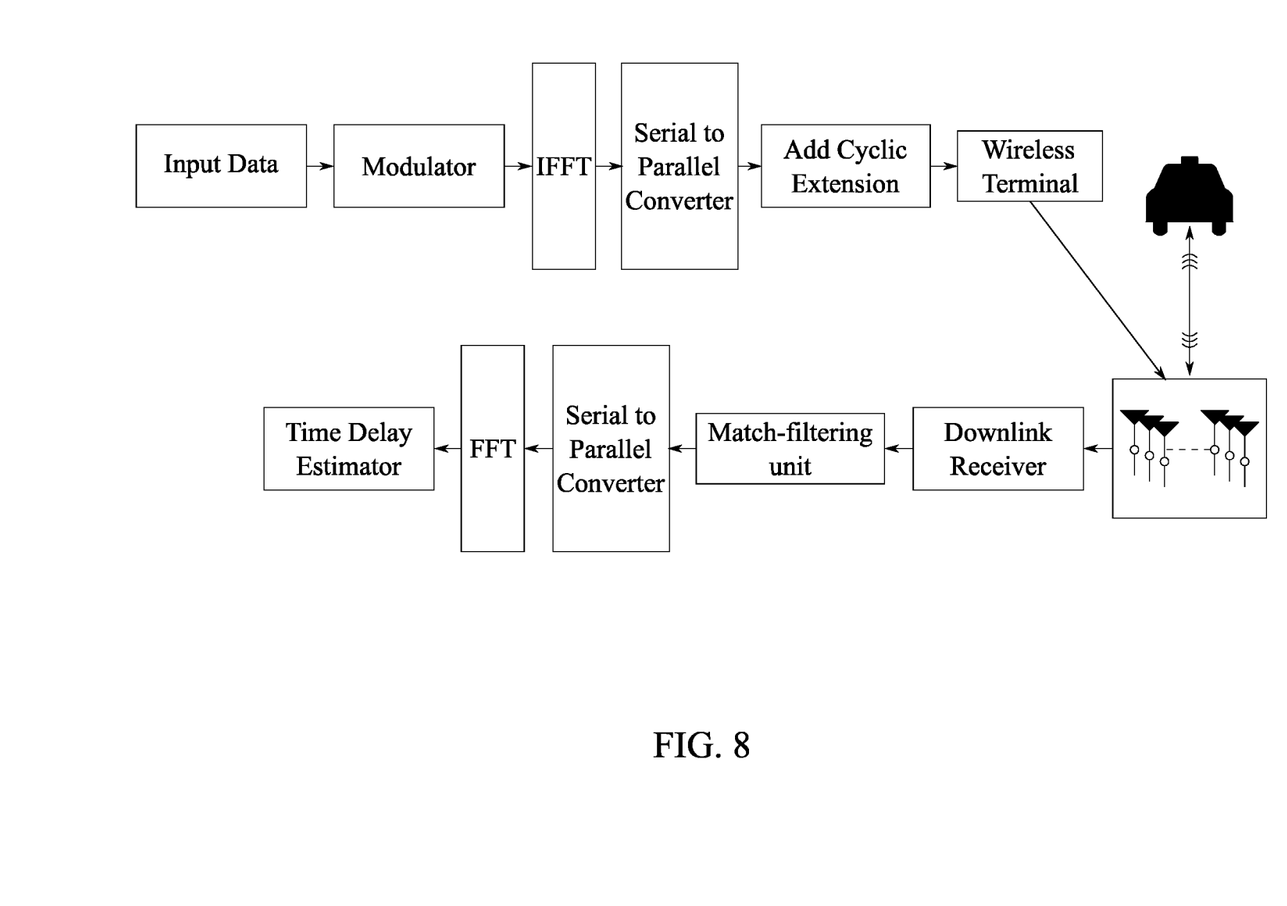
FIG. 8 is an illustration of the process of calculating the time delay utilizing the serial-to-parallel converter.
Figure 9:
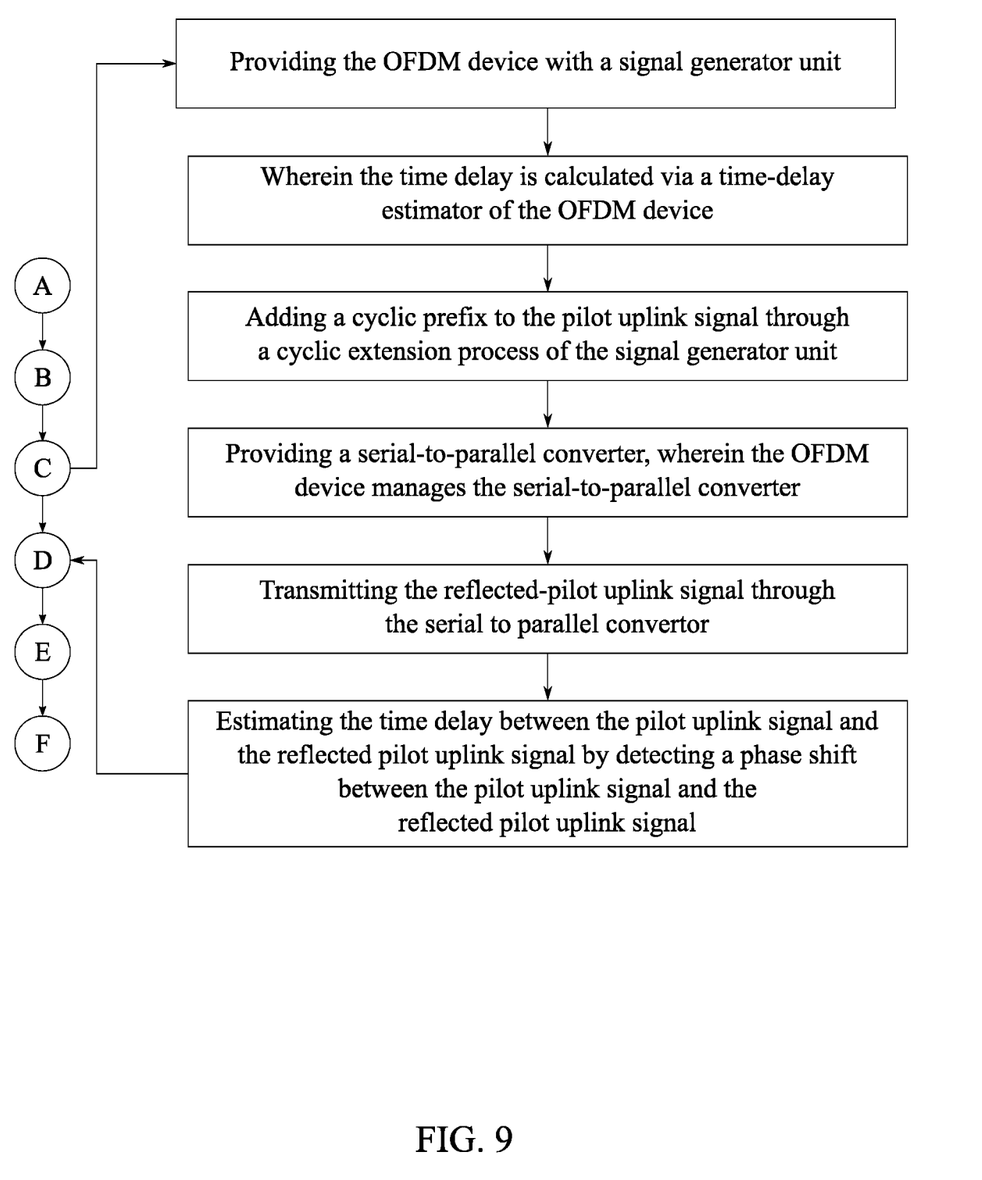
FIG. 9 is a flowchart illustrating the basic overall process of using a serial-to-parallel converter for estimating the time delay.
Figure 10:
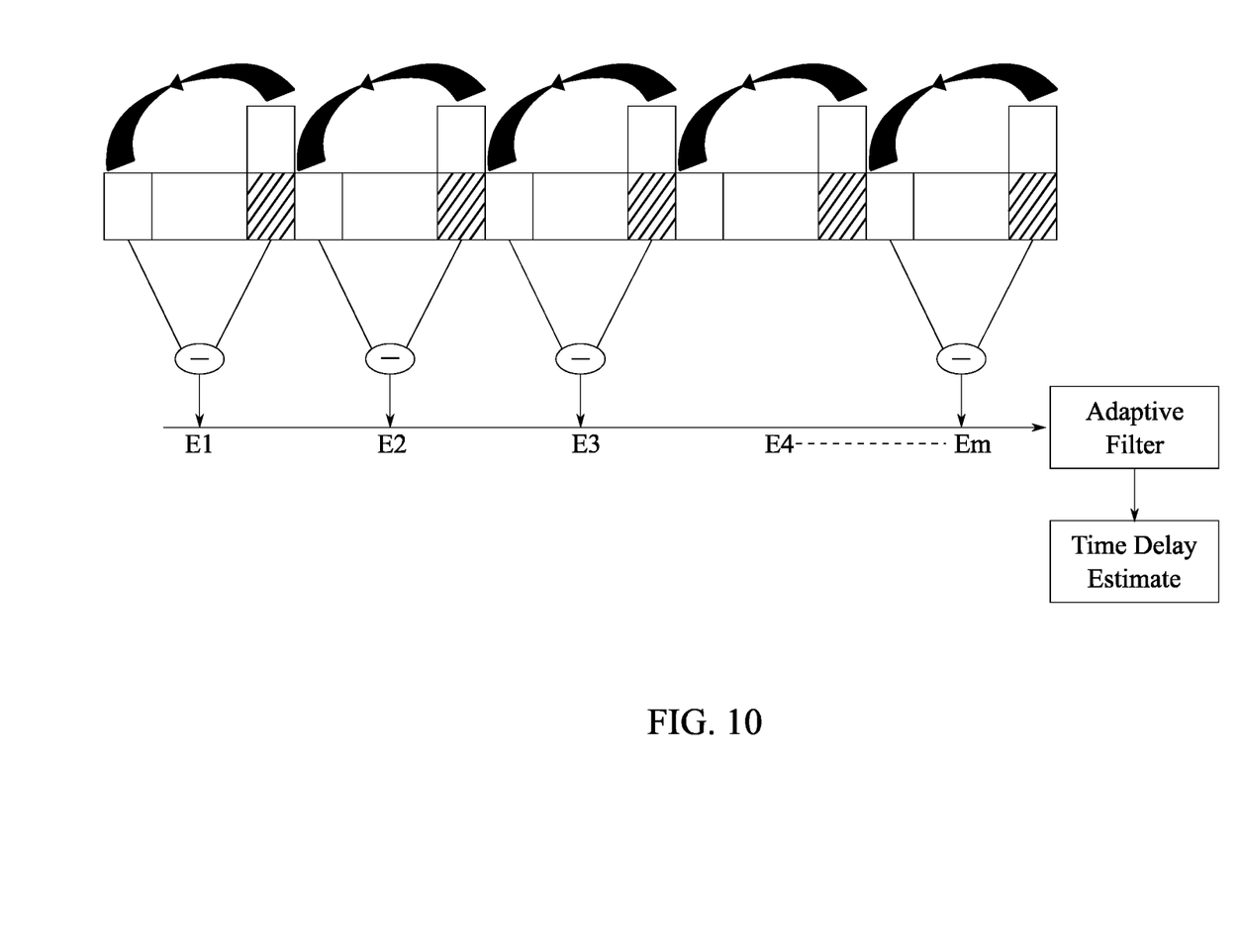
FIG. 10 is an illustration of the time delay estimation process at each subcarrier of the pilot uplink signal.

As shown in FIG. 8 and FIG. 9, in one embodiment of the present invention, a serial-to-parallel converter can be utilized with a time-delay estimator for the location approximation process. In such instances, the reflected-pilot uplink signal is directly transmitted into the serial-to-parallel converter inclusive of the cyclic prefix. More specifically, the cyclic prefix is used to form the input of an optimal filter that is used in time delay calculations. By doing so, a phase shift between the pilot uplink signal and the reflected-pilot uplink signal is detected through a Fourier transform process. As illustrated in FIG. 10, the phase shift between the pilot uplink signal and the reflected-pilot uplink signal can then be used to detect the time delay which is used to derive the location approximation.

As an example, we will consider the inverse discrete Fourier transform (IDFT) of a pilot uplink signal denoted by vector S ($S_1$, $S_2$, $S_3$, . . . $S_N$), wherein N represents the dimension of the vector S. Upon contacting the intended target, the reflected-pilot uplink signal is received at the wireless terminal and is denoted by $\hat{S}(\hat{s}_1$ (t–π), $(\hat{s}_1$ (t–τ), . . . , $(\hat{s}_1(t-\tau))$, π ∈(1, 2, . . . , k), wherein k is the number of possible targets. When estimating the time delay, which is represented by τ, an optimal τ is calculated as τ=min ($\|S-\hat{S}\|^2$). When calculating the time delay for each of the plurality of echo signals, the present invention forms an error vector of m-dimension. Therefore, the plurality of echo signals received at the wireless terminal can be denoted as $\hat{S}_n(t) = S_n(t) + \Sigma_n^i s_n^i(t-\tau_i)$. In relation to the mentioned variable for the given vectors, the optimal filter is designed to minimize $T_i = \text{Min}(\Sigma_{n=0}^N \Sigma_{m=1}^M (E_n^m(\tau_i)))$, wherein $E_n^m(\tau_i) = \|cp^m(t) - s^m(t-\tau_i)\|$ and T is a vector of dimension k. As discussed earlier, k is the number of intended targets of the present invention. In this instance, $cp^m(t)$ is the cyclic prefix signal vector of the reflected-pilot uplink signal that was received at the wireless terminal. More specifically, m is the OFDM symbol index in a subframe $s^m$, and $(t-\tau_i)$ is the symbol block repeated by the cyclic prefix block with a time shift of $\tau_i$, where $\tau_i \in (0, \text{max time delay})$. Furthermore, $\tau_i$ can be assigned a preferred resolution within the defined by the operational range of the MIMO antenna and can be controlled dynamically via artificial intelligence.

Figure 11:
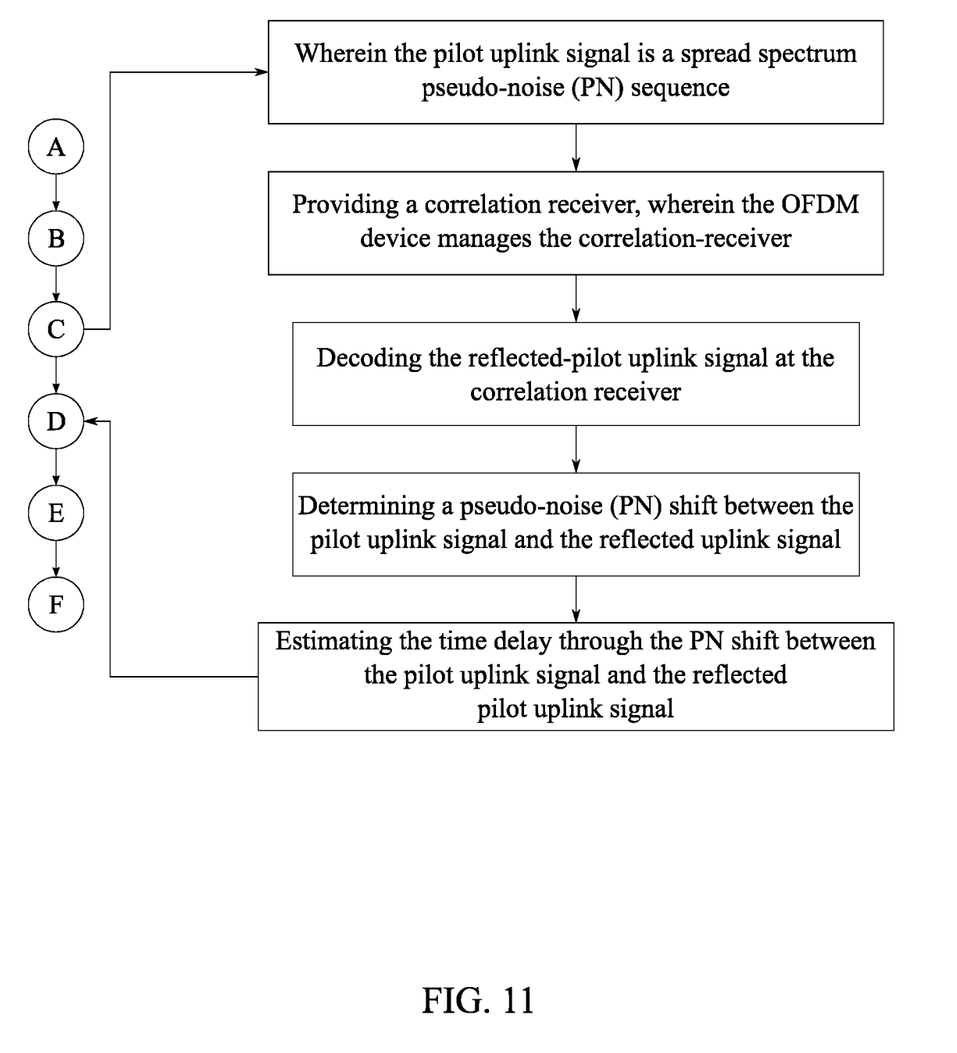
FIG. 11 is a flowchart illustrating the basic overall process of estimating the time delay, wherein the pilot uplink signal is a pseudo-noise (PN) sequence.
Figure 12:
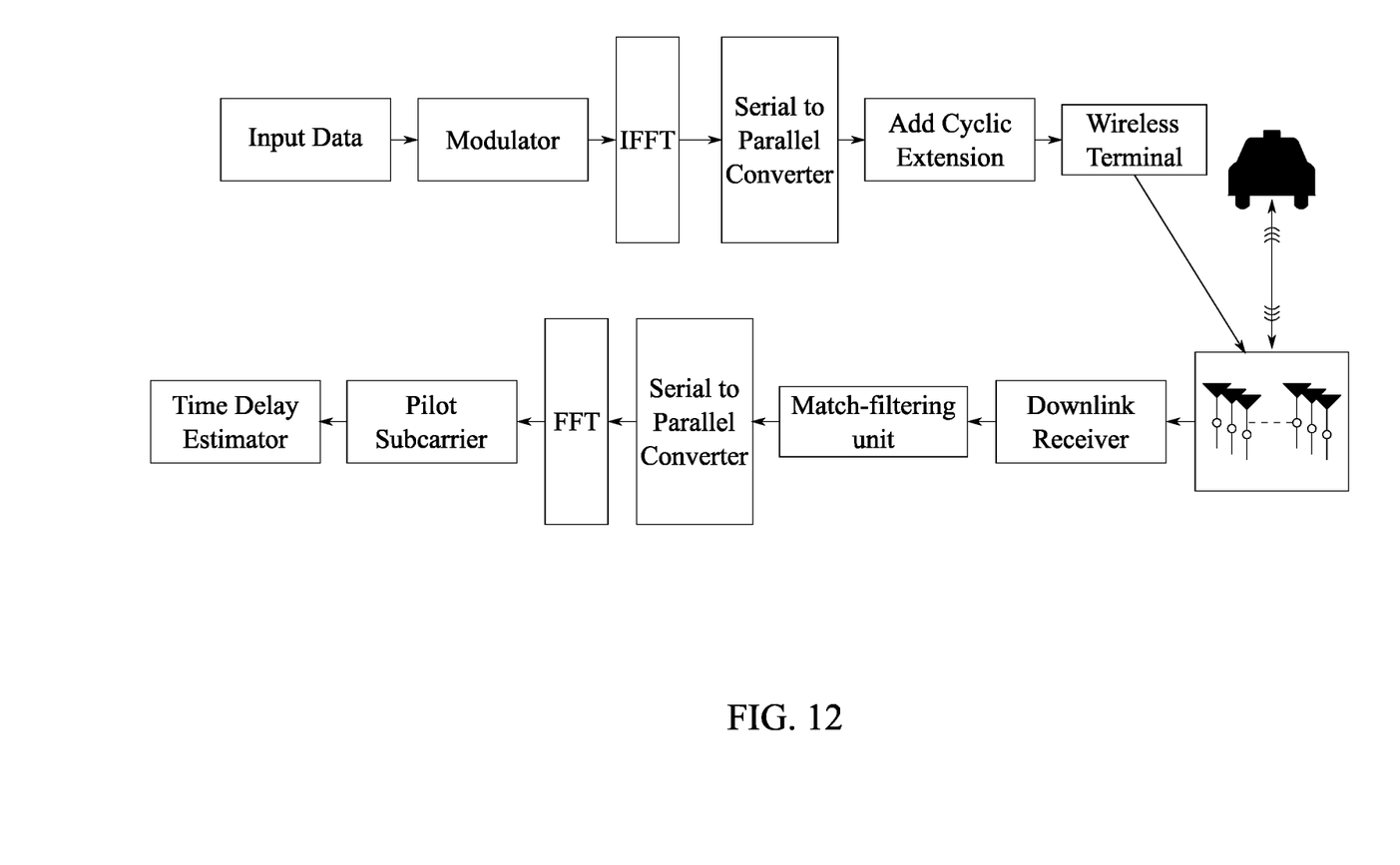
FIG. 12 is an illustration of the process of calculating the time delay utilizing the PN shift.

Preferably, the pilot uplink signal transmitted from the wireless terminal is an orthogonal code sequence. However, as illustrated in FIG. 11 and FIG. 12, due to the short-range characteristics of the present invention, a spread spectrum pseudo-noise (PN) sequence can also be transmitted from the wireless terminal as the pilot uplink signal. Both orthogonal code sequences and PN sequences enable multiple target detecting due to the orthogonality. To decode the PN sequence of the reflected-pilot uplink signal, the present invention is provided with a correlation receiver that is managed by the OFDM device. By decoding the reflected-pilot uplink signal at the correlation receiver, the present invention determines the PN shift between the pilot uplink signal and the reflected-pilot uplink signal. The PN shift is then used to estimate the time delay between the pilot uplink signal and the reflected-pilot uplink signal. As an example, the output from the correlation receiver can be represented as $P_i = \hat{S}_i(j) \cdot S_i^T$ $i \in (1, 2, \ldots k)$. More specifically, the output is the product vector of subcarrier i of the PN sequence and $\hat{S}_i$, which is the reflected-pilot uplink signal received at subcarrier i. In the above representation, k defines the number of pilot uplink subcarriers. Moreover, if M represents the length of the PN sequence, $j \in (1, 2, \ldots M)$. The resulting time delay estimation will have M×K matrices of $P_1(j), P_2(j) \ldots P_k(j)), S_i$ where $i \in (1, \ldots K)$.

Although the invention has been explained in relation to its preferred embodiment, it is to be understood that many other possible modifications and variations can be made without departing from the spirit and scope of the invention as hereinafter claimed.

What is claimed is:

1. A method for vehicle location estimation using orthogonal frequency-division multiplexing (OFDM) comprises the steps of:
   (A) providing an orthogonal frequency-division multiplexing (OFDM) device, wherein the OFDM device comprises a wireless terminal and a multiple-input and multiple-output (MIMO) antenna;
   (B) transmitting a pilot uplink signal from the wireless terminal to an intended target, wherein the intended target is within an operational range of the MIMO antenna;
   (C) receiving a plurality of echo signals at the wireless terminal from a plurality of target-surrounding objects, wherein the plurality of echo signals is generated when the pilot uplink signal is reflected from the intended target onto the plurality of target-surrounding objects and off the plurality of target-surrounding objects;
   (D) calculating a time delay between the pilot uplink signal transmitted from the wireless terminal and each of the plurality of echo signals received at the wireless terminal, wherein the time delay is calculated by the OFDM device;
   (E) deriving a direction of arrival (DOA) for a reflected-pilot uplink signal, a downlink signal, and the plurality of echo signals through the MIMO antenna, wherein the reflected-pilot uplink signal and the downlink signal are received at the wireless terminal, wherein the reflected-pilot uplink signal is reflected from the intended target; and
   (F) deriving a location approximation for the intended target through the OFDM device, wherein the location approximation is derived from the time delay and the DOA of the reflected-pilot uplink signal, the downlink signal, and the plurality of echo signals.

2. The method for vehicle location estimation using OFDM as claimed in claim 1 further comprises the steps of:
   providing the OFDM device with a match-filtering unit, a crosstalk-cancelling unit, and a radar-processing unit;
   transferring an ambient signal through the match-filtering unit, the crosstalk-cancelling unit, and the radar-processing unit, wherein the ambient signal includes the reflected-pilot uplink signal, the downlink signal, and the plurality of echo signals, wherein the reflected-pilot uplink signal was generated upon the pilot uplink signal contacting the intended target and received at the wireless terminal;
   filtering out the downlink signal through the match-filtering unit to determine the DOA;
   filtering out the reflected-pilot uplink signal at the crosstalk-cancelling unit, wherein the pilot uplink signal was transmitted from the wireless terminal;
   calculating a distance and a speed for each of the plurality of target-surrounding objects at the radar-processing unit, wherein the distance and the speed for each of the plurality of target-surrounding objects is calculated from the plurality of echo signals; and
   estimating the time delay between the pilot uplink signal and each of the plurality of echo signals, wherein the distance and the speed are used to estimate the time delay.

3. The method for vehicle location estimation using OFDM as claimed in claim 1 further comprises the steps of:
   providing the OFDM device with a signal generator unit;
   wherein the time delay is calculated via a time-delay estimator managed by the OFDM device;
   adding a cyclic prefix to the pilot uplink signal through a cyclic extension process of the signal generator unit;
   removing the cyclic prefix of the reflected-pilot uplink signal, the downlink, and the plurality of echo signals via the cyclic extension process of the signal generator unit;
   determining the DOA from the reflected-pilot uplink signal, the downlink signal, and the plurality of echo signals;
   transferring the plurality of echo signals through the time-delay estimator; and
   estimating the time delay between the pilot uplink signal and each of the plurality of echo signals through the time-delay estimator.

4. The method for vehicle location estimation using OFDM as claimed in claim 1 further comprises the steps of:
   providing the OFDM device with a signal generator unit;
   wherein the time delay is calculated via a time-delay estimator of the OFDM device;
   adding a cyclic prefix to the pilot uplink signal through a cyclic extension process of the signal generator unit;
   determining the DOA from the reflected-pilot uplink signal, the downlink signal, and the plurality of echo signals;
   transferring the plurality of echo signals to the time-delay estimator through an adaptive filter, wherein the adaptive filter is managed by the OFDM device; and
   estimating the time delay between the pilot uplink signal and each of the plurality of echo signals, wherein the time delay is calculated from the cyclic prefix of the pilot uplink signal.

5. The method for vehicle location estimation using OFDM as claimed in claim 1 further comprises the steps of:
provide the OFDM device with a signal generator unit;
wherein the time delay is calculated via a time-delay estimator of the OFDM device;
adding a cyclic prefix to the pilot uplink signal through a cyclic extension process of the signal generator unit;
providing a serial-to-parallel converter, wherein the OFDM device manages the serial-to-parallel converter;
transmitting the reflected-pilot uplink signal through the serial-to-parallel convertor; and
estimating the time delay between the pilot uplink signal and the reflected-pilot uplink signal by detecting a phase shift between the pilot uplink signal and the reflected-pilot uplink signal.

6. The method for vehicle location estimation using OFDM as claimed in claim 5, wherein the phase shift is detected through a Fourier transform process.

7. The method for vehicle location estimation using OFDM as claimed in claim 1, wherein the pilot uplink signal is an orthogonal code sequence.

8. The method for vehicle location estimation using OFDM as claimed in claim 1, wherein the pilot uplink signal is a spread spectrum pseudo-noise (PN) sequence.

9. The method for vehicle location estimation using OFDM as claimed in claim 8 further comprises the steps of:
providing a correlation receiver, wherein the OFDM device manages the correlation-receiver;
decoding the reflected-pilot uplink signal at the correlation receiver;
determining a pseudo-noise (PN) shift between the pilot uplink signal and the reflected-pilot uplink signal; and
estimating the time delay through the PN shift between the pilot uplink signal and the reflected-pilot uplink signal.

* * * * *